UNITED STATES PATENT OFFICE.

JOHANN RINGEL, OF STRASSBURG, GERMANY.

COMPOUND OR MIXTURE FROM WHICH TO MAKE FORMS FOR PRODUCING CASTINGS OR OBJECTS FROM MATERIALS OF ANY KIND.

1,200,138.

Specification of Letters Patent.

Patented Oct. 3, 1916.

No Drawing.

Application filed May 21, 1913. Serial No. 769,039.

*To all whom it may concern:*

Be it known that I, JOHANN RINGEL, a citizen of the Empire of Germany, residing at 31 Dreizehnergraben, Strassburg, in Alsace, in the Empire of Germany, have invented a new and useful Compound or Mixture from Which to Make Forms for Producing Castings or Objects from Materials of Any Kind, of which the following is a specification.

My invention relates to a novel mixture for making forms for producing castings or objects from materials of any kind, which mixture presents special advantages as will hereinafter be set forth. For making the forms proper I employ a mixture of pozzuolana and dehydrated gypsum, to which in certain cases also other indifferent materials, such as kaolin, ocher, ultramarine and the like, may be added. The mixture of pozzuolana and gypsum is useful for making forms intended for the casting of metals. When the forms to be made are intended for the casting or forming of objects from enamel, glass, etc., the said mixture will also answer the purpose and for certain cases the additions named above to the mixture will be found to be particularly useful. The forms made from the novel mixture can be heated up to a very high temperature without falling to pieces which is not possible with any of the materials hitherto used for making forms. This important property of the novel mixture renders it particularly suitable for the manufacture of glass objects. When any form thus once heated is again heated by the casting of the object or by the forming of the hot plastic glass, this form will easily fall to pieces, so that the object produced can be easily freed from the adhering pieces. For the manufacture of glass objects the first heating of the form is necessary, as thereby and by means of the second heating it is rendered possible to obtain various degrees of luster, gloss or matting of the glass by adjusting the temperature of the form during the first heating and by selecting the composition of the mixture for the form.

The patterns for making the forms may be hard or soft and may even for example be replaced by natural plants or the like. When casting metals or the like it is even possible to produce objects as fine as for example leaves or the like of natural plants.

I will now proceed to describe my invention more particularly.

For casting metals the form is made from a mixture of 54 parts of dehydrated gypsum and of from 147 to 183 parts of pozzuolana. For casting glass or forming plastic hot glass the form is made from a mixture of 54 parts of dehydrated gypsum and from 96 to 142 parts of pozzuolana. The following list will indicate the composition of the mixture for making forms for various purposes:

Form for enamel: 54 parts of gypsum and 96 parts of pozzuolana.

Form for crystal-glass: 54 parts of gypsum and 118 parts of pozzuolana.

Form for colored glass: 54 parts of gypsum and 136 parts of pozzuolana.

Form for pure glass: 54 parts of gypsum and 142 parts of pozzuolana.

Form for tin and lead: 54 parts of gypsum and 147 parts of pozzuolana.

Form for silver and gold: 54 parts of gypsum and 158 parts of pozzuolana.

Form for bronze: 54 parts of gypsum and 169 parts of pozzuolana.

Form for iron and steel: 54 parts of gypsum and 183 parts of pozzuolana.

Experience will easily and soon show how much of the additions to this mixture, such as kaolin, ocher, ultramarine, and the like, may be taken, if so preferred. The essential point is, that the form made from the mixture will withstand the selected high temperature up to which the form is first heated, without falling to pieces.

When during the first heating the form is heated up to a moderate temperature and a semi-fluid plastic glass is blown or pressed into the form, a very bright glass object will be obtained, in which the details are more or less indistinct which in some cases is very desirable for artistic reasons. When a very porous form is heated up to a bright red heat and a glass as liquid as possible is cast into the form a glass object with a strong matting will be obtained, in which the details are very distinct. By varying the temperature up to which the form is first heated, further by varying the degree of porosity of the form and by varying the degree of liquidity of the plastic glass most diversified kinds of glass objects can be obtained. I lay special stress upon the possibility of producing with a single casting or forming diversified degrees of matting upon the same glass object by merely adjusting the degree of porosity of the form and by multiplying or omitting the small air-holes, which possibility is valuable for practical and artistic reasons.

For making a form the constituent parts named above of the mixture are first powdered and mixed. Then the mixture is wetted with cold water in a bowl or dish so as to form a liquid paste. This paste behaves like wetted plaster, that is to say it warms and hardens during cooling. It can be applied to all patterns, whether they be hard or soft or whether they be made of metal or clay, wax or the like, also the paste may be applied to natural objects, such as plants or the like.

The relatively considerable percentage of dehydrated gypsum in the mixture renders it possible to make the form on any pattern or object, while the pozzuolana of the mixture enables the form to become sufficiently fire-proof for withstanding the above mentioned high temperature during the first heating without falling to pieces while it is the second heating during the casting of metal or during the blowing or pressing the hot plastic glass, which causes the form to again fall to pieces.

I am aware that it is known to make forms from gypsum alone, also that it is possible to make forms by applying clay to soft objects. However, the forms so produced can not be compared to the forms made according to my mixture. I particularly point out, that the forms made from gypsum alone or from clay can not withstand the heat during casting.

I claim:

1. A compound for forming heat resisting molds, consisting of a mixture of pozzuolana with a lime ingredient consisting solely of dehydrated gypsum.

2. The mixture of 54 parts of dehydrated gypsum and of from 96 to 183 parts of pozzuolana for the formation of a form or mold.

3. A compound for forming heat resisting molds, consisting of a mixture of pozzuolana with a lime ingredient consisting solely of dehydrated gypsum in definite relative quantities, and associated with an indifferent material to add body to the mixture.

4. The mixture of 54 parts of dehydrated gypsum and of from 96 to 183 parts of pozzuolana with the addition of an indifferent material for the formation of a form or mold.

JOHANN RINGEL.

Witnesses:
D. RIFI,
CHARLES A. HALLEY, Jr.